July 25, 1944.  C. A. PEMBERTON  2,354,401
MEAT COOKING CARTON
Filed July 8, 1943

Inventor
Christopher A. Pemberton
by
ATTY.

Patented July 25, 1944

2,354,401

UNITED STATES PATENT OFFICE 2,354,401

MEAT-COOKING CARTON

Christopher A. Pemberton, Toronto, Ontario, Canada

Application July 8, 1943, Serial No. 493,951

3 Claims. (Cl. 99—438)

The present invention relates to containers or receptacles for holding dessicated meats of various kinds during the cooking operation or moulding after processing.

The shortage of metals prohibits the manufacture of sheet metal containers for this purpose and the principal objects of the present invention is to provide a carton or cardboard holder for effectively holding meats and retaining their juices and other qualities while subjected to the heat of cooking and which will effectively withstand the temperatures to which such goods are subjected.

The principal features of the invention consist in providing a folded sheet of surfaced card which will form a seamless container presenting smooth interior faces which will enable the ready removal of the finished cooked product, and further providing an outer casing for holding the folded seamless sheet in the required position to receive and hold the raw materials of the meat loaf or processed meat and which will present a strong and effective enclosure for said folded carton which will effectively resist the heat of the oven.

In the accompanying drawing

It is well understood by those conversant with the preparation of cooked meats that deep rectangular metal pans formed of sheet metal have been commonly used for the cooking of various kinds of meat loaves, and while such practice was common it nevertheless was true that very much pan stock was tied up in retail establishments by the dealer desiring to store the cooked meat loaf until brought out for sale in the original container in which it was cooked.

This practice has many advantages for the retailer but it requires the manufacturer to have an extraordinary stock of metal pans.

The present invention has been devised primarily to overcome the shortage in sheet metal and to provide a container which will be an excellent substitute for the sheet metal container which will effectively retain all the meat juices during the cooking or moulding and will effectively withstand the high temperatures to which the meat is subjected and further, will provide a container in which the meat may be retained until removed from the container for sale, and the retention of such container will not hamper the continued manufacture.

Figures 4, 5:
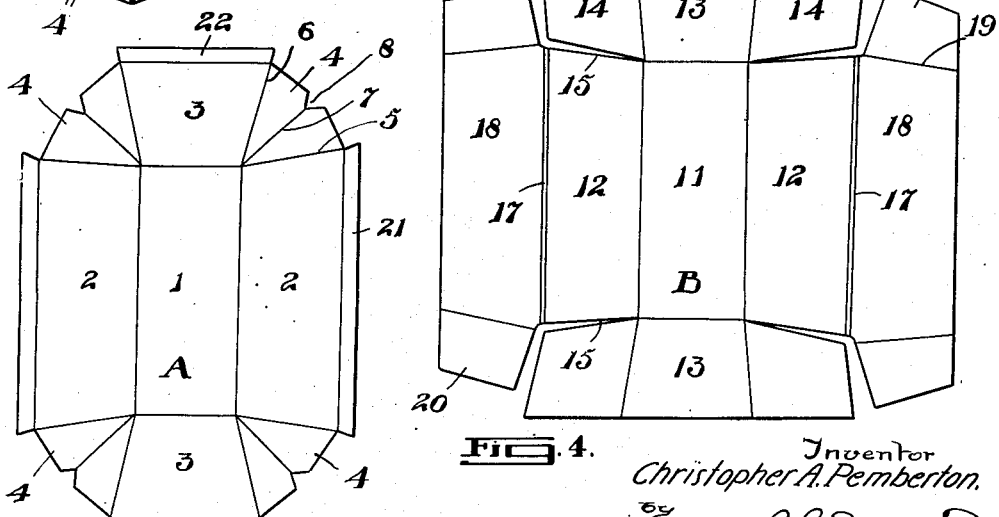
Figure 4 is a reduced scale plan of the cardboard sheet prepared for forming the outer enclosure of the meat-holding seamless carton.
Figure 5 is a plan detail of the single unbroken sheet of material which is folded into the form shown in Figure 3.

In carrying this invention into effect it is preferred that an inner carton A be provided, which may be made of a high grade smooth surfaced calendered cardboard which will be highly resistant to absorption of fats and meat juices. Such a carton is constructed of a single sheet of cardboard, as illustrated particularly in Figure 5. The sheet is formed with a central rectangular portion 1 surrounded by creases at the sides and ends respectively, dividing same from the longitudinal side panels 2—2 and the end panels 3—3.

These side and end panels are joined by V-shaped corner panels 4 and the boundary lines between the panels 2 and 4 and 3 and 4 are formed by creases 5 and 6 which flare outwardly from the centre panel 1.

The corner panels 4 are formed with creases 7 centrally of their width extending inwardly to the apex of the creases 5 and 6, and at the outer end of the creases 7 the said corners 4 are formed with V-shaped notches 8.

Figure 1:
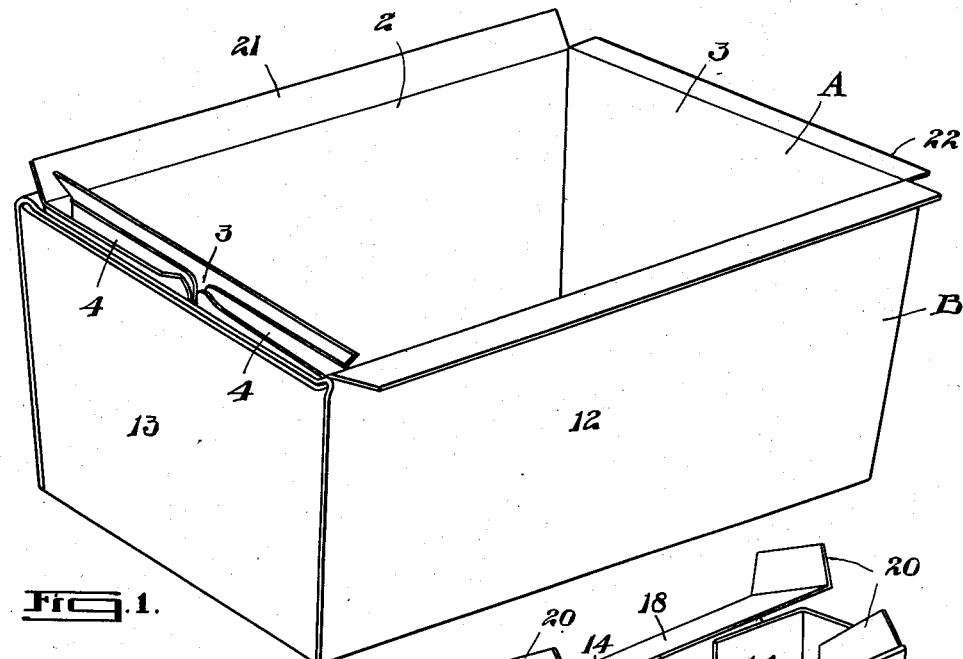
Figure 1 is a perspective view of my improved carton shown enclosed within its outer casing and ready to receive the material to be cooked therein.
Figures 2, 3:
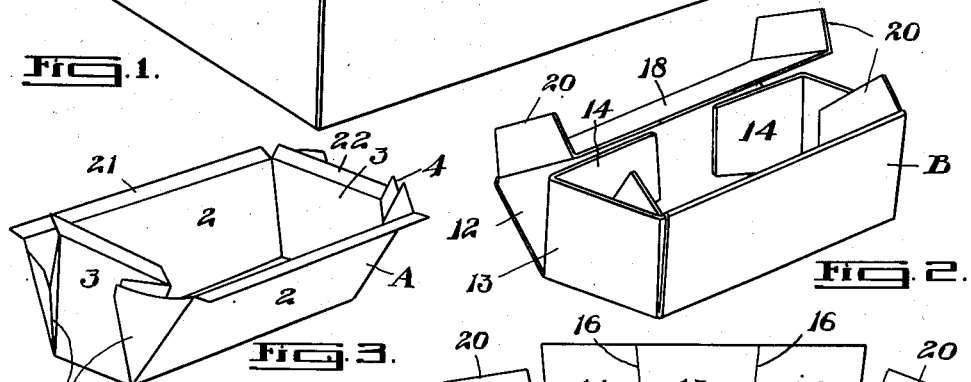
Figure 2 is a perspective view on a reduced scale of the outer enclosure for the seamless inner carton showing said enclosure in the act of being folded.
Figure 3 is a perspective view of the inner seamless meat-holding carton on a reduced scale corresponding with Figure 2.

The creased V-shaped corner members are adapted to be folded outwardly, while the panels 2 and 3 are folded upwardly and inwardly. The corner folds thus extend outwardly and they are preferably folded outside of the end panels 3, as illustrated in Figure 3.

A carton is thus provided which is seamless and the flaring end members 3 when folded up fit snugly between the inner surfaces of the side members 2. A smooth interior is thus provided in the carton which flares slightly upwardly sideways and endways. This upward and outward flare facilitates the packing of the dessicated meat and other ingredients into the carton, and it also provides a tapered clearance to enable the cooked loaf to be easily and quickly removed therefrom.

In order to retain the seamless carton described in a securely folded condition I provide an outside carton B. This outside carton is preferably formed from a single sheet of cardboard, preferably of a much heavier type and much more open textured than the hard calendered surfaced inner carton. This outer carton B is formed with a central rectangular portion 11 which is of slightly greater dimensions than the central panel 1 of the carton A, and extending along either side and marked by longitudinal score lines are the side panels 12, while at the ends are end panels 13 spaced by end score lines.

The end panels 13 have extending from either side thereof the wing members 14 separated from the panels 12 by the slits 15 and defined from the panels 12 by the score marks 16 which flare slightly outwardly from the corners of the centre panel 11.

The ends of the panels 12 defined by the slits 15 flare outwardly and attached along the longitudinal outer edges by the doubled score lines 17 are longitudinal panels 18. These preferably have inwardly convergent end score lines 19 which define the outwardly extending end tabs 20.

In folding up this outer carton the tabs 14 are first turned upwardly bending on the divergent score lines 16. Then the end panels 13 are bent upwardly, thus bringing the end tabs 14 inwardly. The side panels 12 are then bent upwardly, the tabs 20 being first bent upwardly on their score lines, and the panels 18 are then turned over inwardly over the top edges of the tabs 14 of the end panels with the end tabs 20 folding against the inner faces of the end panels 13. The folding of these members is clearly illustrated in Figure 2.

When the panels 18 have been folded in to a vertical position on the inside of the tabs 14 the outside panels lie parallel with the panels 12 and the end edges of the tabs 20 meet at the ends of the carton and thus form an interlock which holds the carton in a solid folded structure without the necessity of any form of fastening means.

The carton A is then placed inside of the carton B and the top edges of the carton B are covered by narrow fold strips 21 and 22 on the side and end panels respectively of the carton A.

A double carton when thus assembled forms a very strong and compact holder, presenting a smooth inner surface into which the meats and other ingredients to make up a meat loaf are placed either raw or pre-processed.

The packed carton may be placed in an oven and baked in the usual manner and it is found that the hard and calendered surfaced cardboard of the inner carton effectively resists the passage of the meat juices and greases therethrough. This inner carton may become saturated but it will not transmit the juices to any material extent.

The outer carton holds the inner carton securely during the cooking operation and the open texture of the card permits the ready transmission of heat therethrough. Further, this outer cardboard is preferably of a dark colour so that heat waves will not be reflected therefrom but will be absorbed and transmitted through into the inner contents of the carton.

After the meat has been sufficiently cooked the double carton with its contents is removed and handled in the usual manner of handling metal containers. The outer carton is strong and durable and does not char under the heat but maintains its protection of the inner carton through trans-shipping, and the white inner carton is maintained intact and in its proper shape until the product is to be removed. Then because of the flared walls of the inner carton the product slips easily therefrom when the same is inverted.

A carton such as described is extremely useful, conserves material and enables the class of merchandise, such as processed meats, to be continued in production even though metal containers may not be available.

What I claim as my invention is:

1. A meat-cooking carton comprising an inner carton of hard calendered card having the bottom, side and end walls presenting smooth unobstructed inner surfaces and an outer carton having a bottom and end walls integral therewith said end walls having integral infolding tabs, side walls integral with the bottom having infolding portions overlapping the infolded end tabs, said infolded side portions having infolded end tabs having the end surfaces adapted to abut and interlock when folded against the end members.

2. A meat-cooking carton comprising an inner seamless carton formed of a single sheet of a hard coated cardboard having a bottom, sides and ends, said sides and ends being connected by corner panels folded on the outward sides of the folded end panels, said side and end panels having outwardly foldable strips, and an outer carton snugly embracing said inner carton and holding the folded corner panels snugly adjacent the end panels with the edges of the end panels held snugly adjacent the side panels.

3. A meat-cooking carton comprising an inner carton formed of a single piece of hard white cardboard having folded portions connecting the ends and side walls and forming a seamless container, and an outer carton formed of interfolded side and end walls and a bottom snugly embracing said inner carton, said outer carton being formed of a dark heat-absorbing cardboard.

CHRISTOPHER A. PEMBERTON.